J. M. SINNETT.
MACHINE FOR CONDITIONING GRAIN.
APPLICATION FILED NOV. 22, 1911.

1,034,523.

Patented Aug. 6, 1912.

WITNESSES:
Chas. H. Hughes.
Ethel M. Jones

INVENTOR.
James M. Sinnett.
BY Harry D. Wallace
ATTORNEY.

UNITED STATES PATENT OFFICE.

JAMES M. SINNETT, OF BALDWINSVILLE, NEW YORK.

MACHINE FOR CONDITIONING GRAIN.

1,034,523. Specification of Letters Patent. Patented Aug. 6, 1912.

Application filed November 22, 1911. Serial No. 661,722.

*To all whom it may concern:*

Be it known that I, JAMES M. SINNETT, a citizen of the United States, residing at Baldwinsville, in the county of Onondaga and State of New York, have invented certain new and useful Improvements in Machines for Conditioning Grain, of which the following is a specification.

This invention relates to improvements in devices for conditioning grain, and has for its object to provide a novel, simple, convenient and effective device of the class, by means of which hard wheat or other grains may be externally softened and toughened to put them in proper condition for grinding.

A further object is to provide a suitable receptacle, to be interposed between a storage bin and the grinding machines, which receives the grain by gravity feed, and applies moisture at any desired temperature to the grain.

A further object is to provide novel and simple means for agitating or mixing the grain after it has been wetted, for the purpose of tempering the same evenly.

A further object is to provide a power driven device of the class, so constructed and arranged that a comparatively small and inexpensive machine is capable of conditioning sufficient grain to supply a number of grinding machines at a small expense, and a further object is to provide simple means for applying steam or hot water to the grain for the purpose of more readily and more effectually tempering the grain.

The various features and parts of the invention will be understood from the detailed description which follows, and by reference to the accompanying drawing which forms a part of this specification, and in which—

Figure 1:
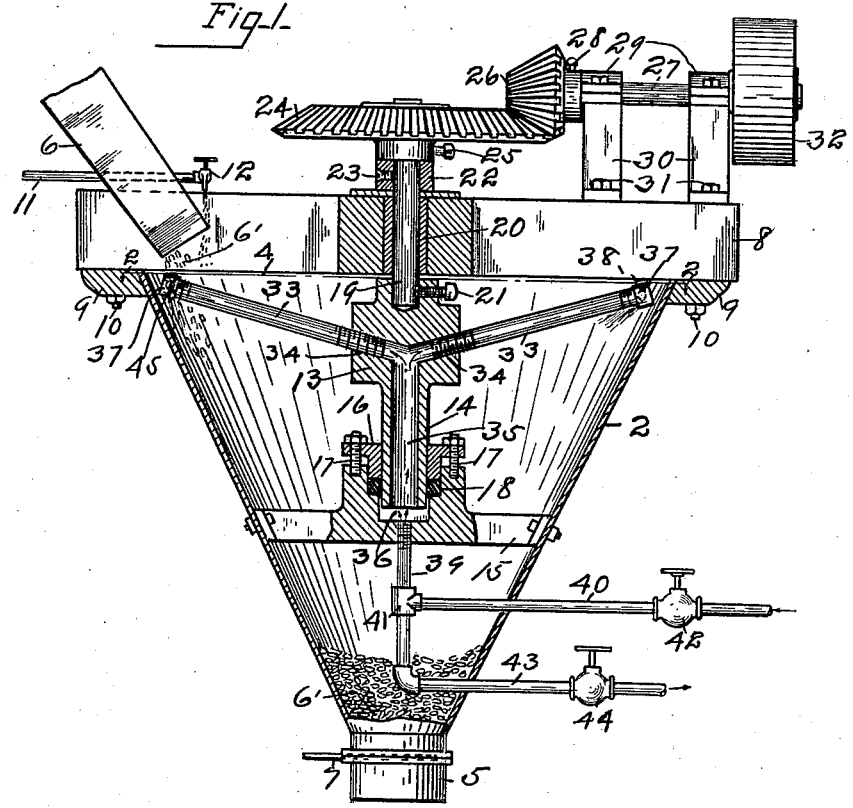
Figure 2:
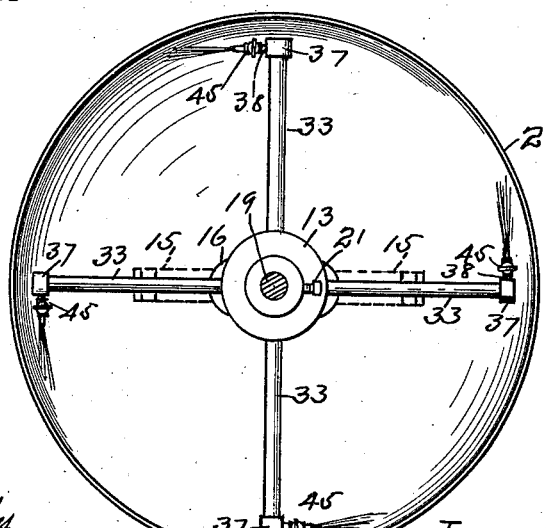

Figure 1 is a central vertical section; showing the construction, arrangement and operation of the complete device. Fig. 2 is a horizontal section, substantially on line 2—2 of Fig. 1; showing the revolving agitator in action.

Spring wheat, particularly that which is raised in the Northwest, is mostly what is known as hard wheat. To properly grind the hard spring wheat it is necessary to first temper or condition the grain so as to put it in shape to be ground into flour. The conditioning or tempering usually consists of moistening the outer surface or shell of the berries. This is accomplished by applying water or steam to the grain a short time before it is delivered to the grinding machines. The wetting or moistening of the outer part of the wheat berries, tends to soften and toughen the shells, and if the moisture is maintained until the grain enters the breakers or first grinders, the outer portion is readily separated from the inner portion, the latter comprising the part of the grain from which the fine or pure flour is made. To grind the hard spring wheat without conditioning it renders it impossible to keep all of the coarse outer shell of the berries from mingling with the fine flour. A description of my improved conditioner follows:

In the drawing, 2 represents a funnel-shaped hopper, preferably made of sheet metal of suitable kind and gage, having its top end 4 open, its lower end being contracted into a narrow, tubular neck 5.

6 represents a pipe or chute disposed above and at one side of the hopper, for delivering wheat or other grain 6' by gravity, from a storage bin (not shown), into the large open top of the hopper, and 7 represents a sliding gate or cut-off disposed in the neck 5, for regulating the out-flow of the grain.

The hopper 2 may be located at any convenient place in a mill, and it may be supported in any suitable manner, so long as it is held stationary. The top end 4 of the hopper supports a horizontal timber or bridge-tree 8, which may consist of any suitable material, and the hopper is detachably secured to the tree 8 by means of cleats 9, which in turn are fastened to the under side of the tree 8 by means of bolts or screws 10.

11 represents a water pipe, and 12 a common faucet, for delivering a stream of water on to the wheat or other grain as it is discharged from the lower end of the spout or chute 6. Under this arrangement, the wheat which gravitates into the hopper in a steady stream, is moistened or wetted by the constant flow or drip of the water from the faucet 12, before it is allowed to become mixed with the grain which fills the hopper.

In order to thoroughly and evenly temper, or to properly condition the wheat, particularly the harder varieties of said grain, as explained, it is necessary to stir or agitate the grain, immediately it is discharged into the hopper and wetted. For this purpose, I provide a novel and simple agitator, which with its operating parts will now be described: 13 represents a hub-like part, which is disposed concentrically within the hopper, the lower end of which comprises a hollow neck or journal 14, which is held in operative position by means of a stuffing-box comprising a bridge 15 which is disposed horizontally in the hopper, and a gland 16, the latter being adjustably mounted upon said bridge, and held in place by means of bolts or screws 17. 18 represents a packing which surrounds the neck 14 for making a liquid and air tight joint. The upper end of the hub 13 is bored out to receive a vertical shaft 19, which has its bearing at 20 in the bridge-tree 8, and a set-screw 21 is employed for rigidly connecting the shaft 19 to the hub 13. Immediately above the bridge-tree 8, on the shaft 19, is a collar 22 which is held in place by a set-screw 23 for preventing the hub and the shaft from gravitating out of working position. On the upper end of shaft 19 is rigidly mounted a bevel-gear 24, which is held in place by a set-screw 25, and 26 represents a small bevel-gear which meshes with and drives the gear 24. The gear 26 is rigidly secured to one end of a horizontal shaft 27, by a set-screw 28. The shaft 27 is mounted in bearings 29, which form the upper ends of brackets 30, which rest upon and are secured to the bridge-tree 8 by bolts 31.

The whole of the movable parts of the device are driven by any suitable power applied to a pulley 32, which is mounted upon the outer end of shaft 27. The agitating device when in operation is preferably driven at a speed of from twenty to forty revolutions per minute. The agitation of the moistened grain is accomplished by the means of a plurality of like arms 33, which preferably consist of straight sections of gas pipe, the inner ends of which are screwed into radial holes 34, which are formed in the body of the hub 13, and which communicates with a central opening or passage 35 which extends downwardly through the neck or stem 14. The lower end of the passage 35 opens into a cavity 36 formed in the support 15. The outer or free end of the hollow arms 33 are preferably closed by the usual pipe caps 37, and each of said caps is perforated at 38.

To carry out the objects of the present invention, in warm weather, as a rule, the hard wheat or grain may be properly tempered or conditioned by the use of cold water which is delivered to the hopper through the pipe 11 and the faucet 12. In the winter season, however, when the temperature of the grain is low, it is impossible to properly condition the grain by the use of cold water alone, and in order to render my improvement serviceable for cold, as well as, warm weather, I provide novel means for supplying the requisite amount of heat to the moistened grain. To this end, I utilize the hub 13 and the arms 33 for conducting live steam, or hot water, which is employed for heating the pipes or arms 33, which in turn heat the grain, and the said pipes are arranged to discharge a small jet of the steam through the perforations 38 in the caps 37 while the said arms are rotating and stirring or agitating the wheat. The steam is supplied to the hub 13 by means of a pipe 39, which connects at its upper end to the bridge 15, and communicates with the cavity 36. The steam is delivered to the pipe 39 by another pipe 40, which pierces the lower portion of the hopper and connects with pipe 39 by means of a T 41. The pipe 40 is fitted with the usual valve 42 for controlling the supply of steam. The water of condensation is carried away from the hub 13 and the arms 33 by gravity, by means of a pipe 43, which connects to the lower end of the pipe 40, and this drain pipe is also fitted with a valve 44 for opening and closing said pipe.

The operation of my improved conditioning device is as follows: The hopper is first filled with grain, and then the power is turned on for rotating the hub 13 and the arms 33. The said arms being disposed at or near the top of the hopper, sweep or carry the grain away from the spout 6, and distribute it in a horizontal direction, and at the same time mix or stir the grain, and keep it in constant motion or agitation, until it gravitates away from said arms. As soon as the arms are set in motion, the faucet 12 is opened for supplying water to the grain adjacent the mouth of the spout 6. Immediately after the power is turned on, the gate 7 is opened to allow the grain to gravitate to the grinding machines. If the grain is cold, the operator may open the valve 42, for allowing steam to enter the hub and arms, for heating the newly moistened grain, as well as for maintaining a suitable temperature throughout the depth of the hopper. If desired a small jet of steam may be allowed to pass out of a series of pet-cocks, or valves 45 which are disposed in the perforations 38, and to play upon the wheat (see Fig. 2), for increasing the moisture and also the heating of the grain.

Obviously some changes or modifications may be made in the device, within the scope defined by the appended claims without departing from the spirit of the invention as herein shown and described.

Having thus described my invention, what I claim and desire to secure by Letters Patent, is—

1. The combination with a hopper, said hopper having a flaring open top and a contracted gated bottom, of a spout for delivering grain into the top of said hopper, said spout disposed at one side of the hopper, a rotatable hub disposed centrally in said hopper, a plurality of radial arms supported and driven by said hub, said arms inclining upwardly from the said hub toward the mouth of said hopper, the free ends of said arms adapted to successively pass beneath and to sweep the grain away from the mouth of said spout, means for supplying water to the grain as it gravitates from the said spout, and means for driving said hub.

2. The combination of a hopper having a flaring open top, and a contracted bottom controlled by a gate, a spout for delivering grain to one side of the open top of the hopper, a pipe for delivering water for wetting the grain as it leaves the said spout, an agitator comprising a rotatable hub disposed centrally in the upper portion of said hopper, a plurality of upwardly inclining radial arms carried by said hub, the said arms adapted to successively sweep the grain from the mouth of said spout for agitating, and for distributing the moisture throughout the grain, and a power driven mechanism for rotating said hub and said arms.

In testimony whereof I affix my signature in presence of two witnesses.

JAMES M. SINNETT.

Witnesses:
 E. C. WRIGHT,
 HARRY DeWALLACE.

---

Copies of this patent may be obtained for five cents each, by addressing the "Commissioner of Patents, Washington, D. C."